US008300603B2

United States Patent
Chowdhury et al.

(10) Patent No.: US 8,300,603 B2
(45) Date of Patent: Oct. 30, 2012

(54) LOCATION REPORTING IN WIRELESS NETWORKS

(75) Inventors: Kuntal Chowdhury, Andover, MA (US); Rajesh Ramankutty, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 12/620,433

(22) Filed: Nov. 17, 2009

(65) Prior Publication Data

US 2010/0260141 A1    Oct. 14, 2010

Related U.S. Application Data

(60) Provisional application No. 61/115,357, filed on Nov. 17, 2008.

(51) Int. Cl.
*H04W 64/00*    (2009.01)

(52) U.S. Cl. ............. 370/331; 455/404.2; 455/436; 455/456.1

(58) Field of Classification Search .......... None
See application file for complete search history.

(56) References Cited

U.S. PATENT DOCUMENTS

| | | | |
|---|---|---|---|
| 2003/0050076 | A1 | 3/2003 | Watanabe |
| 2004/0156326 | A1* | 8/2004 | Chithambaram ............. 370/310 |
| 2007/0082681 | A1 | 4/2007 | Kim et al. |
| 2007/0254673 | A1 | 11/2007 | Stenberg et al. |
| 2008/0233947 | A1 | 9/2008 | Herrero-Veron |
| 2008/0254768 | A1 | 10/2008 | Faccin |
| 2008/0316972 | A1* | 12/2008 | Shaheen ............... 370/331 |
| 2009/0268635 | A1* | 10/2009 | Gallagher et al. ........... 370/254 |
| 2010/0041418 | A1* | 2/2010 | Edge et al. ............... 455/456.2 |
| 2010/0054207 | A1* | 3/2010 | Gupta et al. ............ 370/331 |
| 2010/0267388 | A1* | 10/2010 | Olsson ................. 455/436 |

OTHER PUBLICATIONS

3GPP TS 23.401 V8.3.0 (Sep. 2008), 3rd Generation Partnership Project; Technical Specification Group Services and System Aspects; General Packet Radio Service (GPRS) enhamcements for Evolved Universal Terrestrial Radio Access Network (E-UTRAB) access (Release 8); http://www.3gpp.org.

3GPP TS 29.060 V7.11.0 (Sep. 2008); 3rd Generation Partnership Project; Technical Specification Group Core Network and Terminals; General Packet Radio Service (GPRS); GPRS Tunnelling Protocol (GTP) across the Gn and Gp interface (Release 7); http://www.3gpp.org.

3GPP TS 29.060 V8.5.0 (Sep. 2008); 3rd Generation Partenership Project; Technical Specification Group Core Network and Terminals; General Packet Radio Service (GPRS); GPRS Tunnelling Protocol (GTP) across the Gn and Gp interface (Release 8); http://www.3gpp.org.

3GPP TS 36.300 V8.6.0 (Sep. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overal description; Stage 2 (Release 8); http://www.3gpp.org.

International Search Report and Written Opinion for International Application No. PCT/US09/64825 mailed Feb. 16, 2010 (9 pages).

* cited by examiner

*Primary Examiner* — Robert Scheibel
(74) *Attorney, Agent, or Firm* — Wilmer Cutler Pickering Hale and Dorr LLP

(57) ABSTRACT

Location reporting in long term evolution (LTE) wireless networks is provided. Systems and methods are disclosed to provide support of location reporting and messaging at a mobility management entity (MME) to allow location updates to serving gateways (SGWs) and packet data network gateways (PGWs), and for the SGWs and PGWs to activate and de-activate location reporting. The MME also supports detection and communication with the LTE radio access network to provide location reporting back to the communication network. The MME and the accompanying messaging can provide location reporting including enhanced cell global identity (ECGI) and tracking area identity (TAI) information.

20 Claims, 8 Drawing Sheets

LOCATION REPORTING IN WIRELESS NETWORKS

CROSS-REFERENCE TO RELATED APPLICATIONS

This application claims benefit under 35 U.S.C. §119(e) of U.S. Provisional Patent Application No. 61/115,357, entitled "Location Reporting in Wireless Networks," filed Nov. 17, 2008, which is hereby incorporated by reference herein in its entirety.

FIELD OF THE DISCLOSURE

This disclosure relates to a system and method for providing location reporting of a mobile node's location in a communication network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

The first generation of wireless telephone technology used analog mobile phones in which analog information signals were modulated and transmitted. In second generation (2G) systems, digital information signals were used to modulate a carrier. These 2G technologies used time division multiplex access (TDMA) technology for GSM systems, or code division multiple access (CDMA) technologies for IS-95 systems to distinguish multiple users. Such networks were further upgraded to handle higher-speed packet data using GPRS/EDGE and then HSPA, and CDMA 1x-EVDO in networks referred to as 2.5G and 3G networks. The next evolution is 4G technology, which is referred to as long term evolution-system architecture evolution (LTE-SAE) and uses orthogonal frequency division multiple access (OFDMA) technology. Other wireless protocols have also developed including WiFi (an implementation of various IEEE 802.11 protocols), WiMAX (an implementation of IEEE 802.16), and Hiper-MAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. A macro cell transceiver is typically used by service providers to provide coverage over about a five kilometer distance. A pico cell transceiver can provide coverage over about a half kilometer distance, and a femto cell transceiver can provide coverage over a 50-200 meter distance. A femto cell transceiver is similar in coverage to a WiFi (WLAN) access point and can be used to provide network access over a short range.

In some communication networks, location information used to provide certain features in a network. In order to provide these features, the location information is communicated from the mobile node to various network devices. Procedures and messaging is used to carry the location information from the mobile node to these various network devices, and update the information when the mobile node changes location.

SUMMARY OF THE DISCLOSURE

Location reporting in long term evolution (LTE) wireless networks is provided. Systems and methods are disclosed to provide support of location reporting and messaging at a mobility management entity (MME) to allow location updates to serving gateways (SGWs) and packet data network gateways (PGWs), and for the SGWs and PGWs to activate and de-activate location reporting. The MME also supports detection and communication with the LTE radio access network to provide location reporting back to the communication network. The MME and the accompanying messaging can provide location reporting including enhanced cell global identity (ECGI) and tracking area identity (TAI) information.

In some embodiments, a gateway in a communication network implementing a mobility management entity (MME) function is described that includes an interface configured to communicate between the MME function on the gateway and a radio access network, the communications including attach messaging and bearer activation messaging, and receiving at least one of a user equipment (UE) handover messaging and a tracking area update messaging, a processor for enabling UE location reporting on the MME function and detecting a change in at least one of UE location and information received from the radio access network, and an interface configured to communicate between the MME function on the gateway and a serving gateway (SGW) including: sending a create session request including a user location information (ULI) information element that provides location information regarding a UE, and an information element that indicates location reporting is supported, receiving a response message including an indication to start tracking the UE's location, and sending a message to update a change in UE location or information, wherein the message includes an identifier for the UE, a radio access technology type identifier and the ULI.

In other embodiments, a method of reporting location of user equipment in a communication network at a mobility management entity (MME) is described, the method including sending a create session request message from the MME to a serving gateway (SGW) including a user location information (ULI) information element that provides location information regarding a UE, and an information element that indicates location reporting is supported, receiving a response message at the MME from the SGW including an indication to start tracking the UE's location, in response to an indication to start tracking the UE's location, enabling UE location reporting on the MME, detecting a change in at least one of the UE's location and the UE's information at the MME, in response to detecting the change, spending a message to the SGW to update at least one of the UE's location and the UE's information.

In yet other embodiments, a gateway implementing a mobility management entity (MME) function is described that is configured to communicate with at least one radio access network and at least one serving gateway (SGW) to provide location reporting regarding at least one user equipment, the location reporting including detecting a change in UE location information received from the radio access network and creating a location reporting session by exchanging session messages with a SGW that include a user location information (ULI) information element that provides location information regarding a UE and information elements that indicate location reporting is supported and when location reporting can begin, wherein update message are sent to the SGW to update changes in UE location or information as these changes are detected by the MME.

DETAILED DESCRIPTION

Systems and methods of location reporting in communication systems are described. In some embodiments, procedures and update information elements are disclosed that provide location reporting with a packet data network gateway (PDN GW) for long term evolution (LTE) access. Currently, there are no defined procedures or messaging to communicate location information for user equipment (UE), which are mobile nodes, when accessing the LTE network. This can disrupt features such as location based charging, policy enforcement, and access control in a network.

Figure 1:
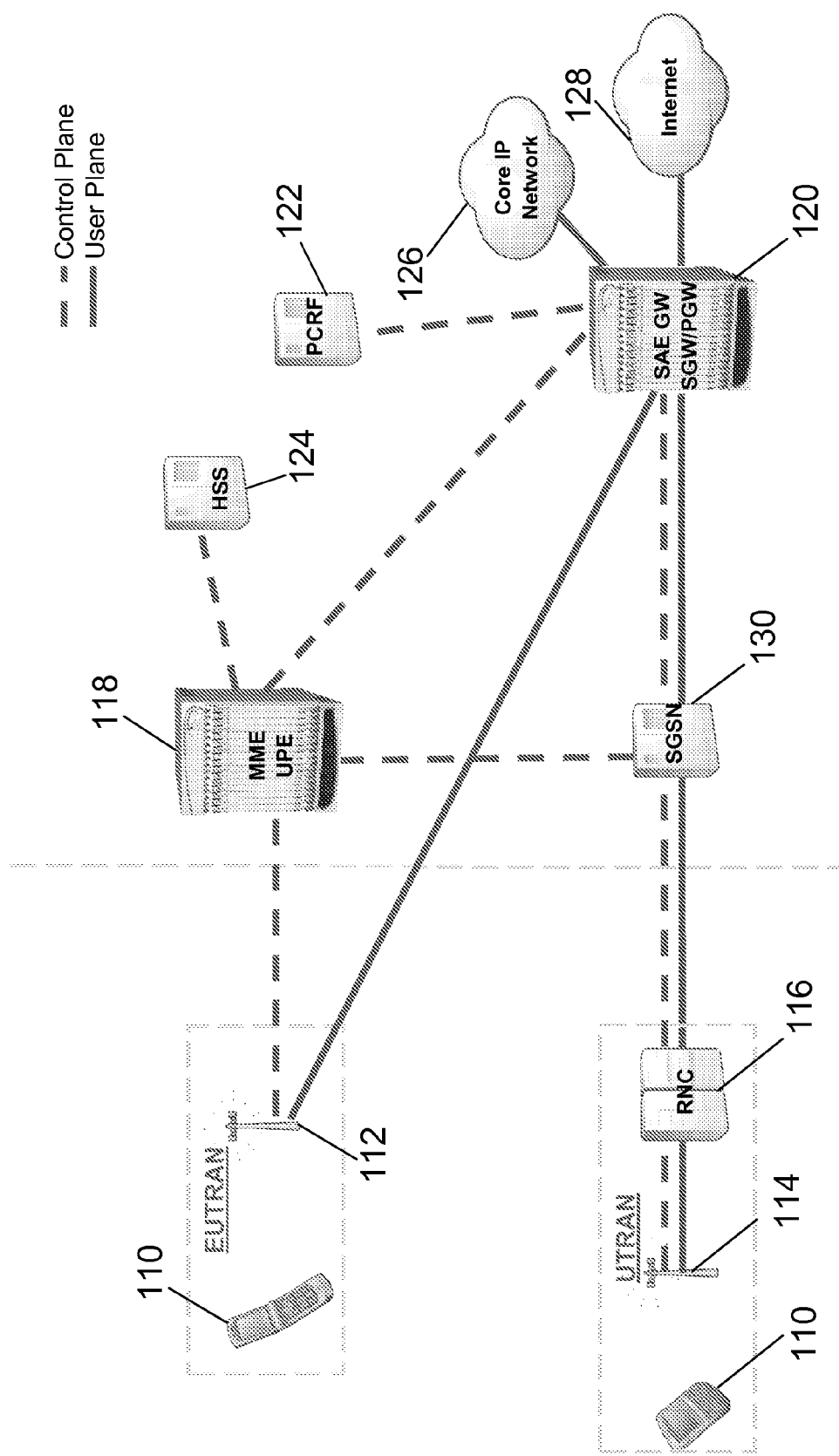
FIG. 1 illustrates a network diagram in accordance with certain embodiments.

FIG. 1 illustrates a network diagram in accordance with certain embodiments. FIG. 1 illustrates both a universal mobile telecommunication system (UMTS) release 8 network and a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, and Serving General packet radio service Support Node (SGSN) 130. The MME 118, SAE GW 120, and SGSN 130 can be implemented in a gateway as described below. The SAE GW 120 can include a serving gateway (SGW) as well as a packet data network gateway (P-GW). In some embodiments, the SGW and P-GW can be implemented on separate network devices. A main component of the SAE architecture is the Evolved Packet Core (EPC), also known as SAE Core. The EPC includes the MME, SGW and P-GW components.

MME 118 is a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g., parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO).

Figure 2:
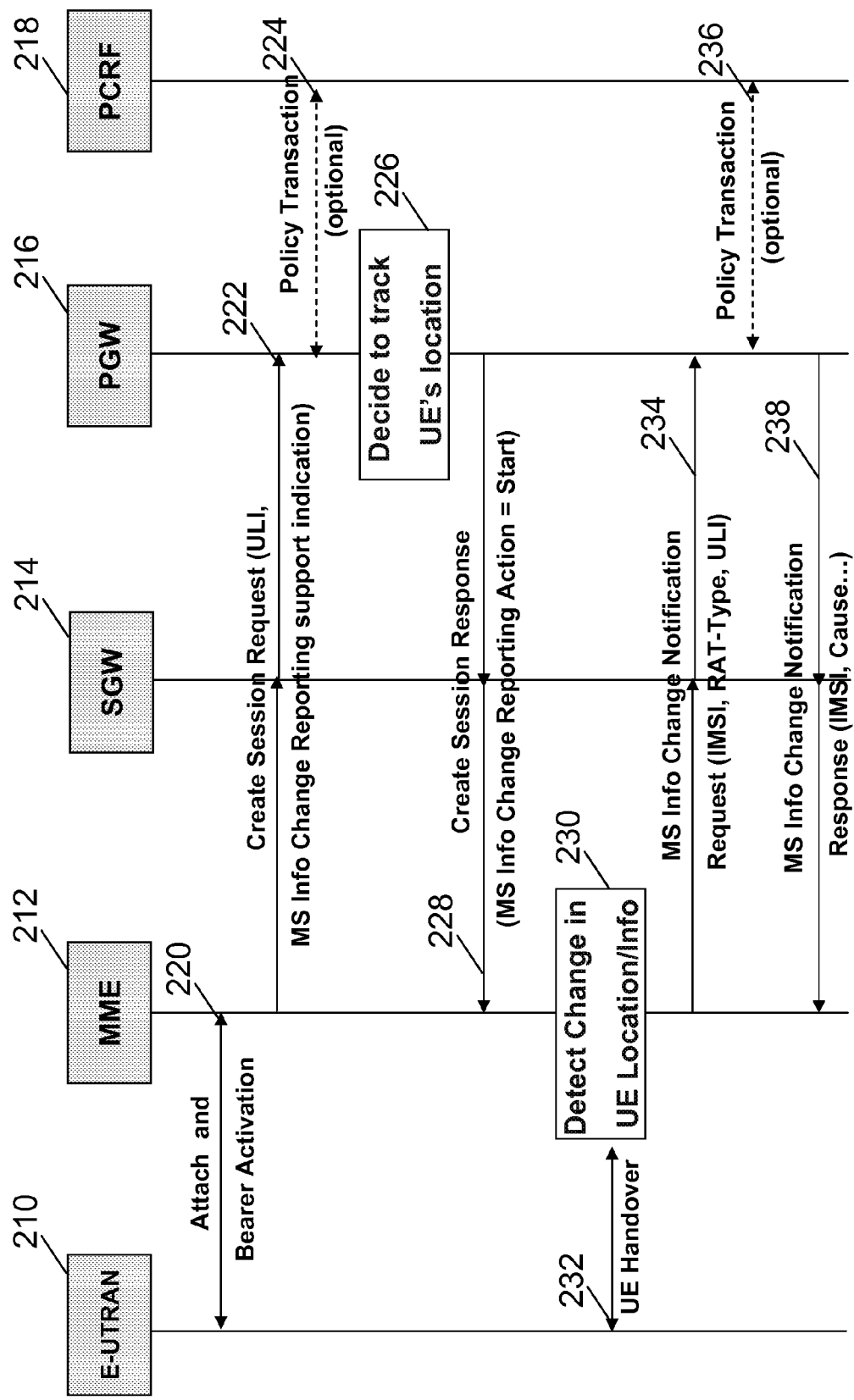
FIG. 2 illustrates a call flow diagram for session setup and handover in location reporting in accordance with certain embodiments.

FIG. 2 illustrates a call flow diagram for session setup and handover in location reporting in accordance with certain embodiments. FIG. 2 includes a evolved UMTS terrestrial radio access network (E-UTRAN) 210, a MME 212, a SGW 214, a P-GW 216, and a PCRF 218. In 220, attachment and bearer activation occurs between the E-UTRAN 210 and MME 212. MME 212 sends a create session request message 222 to PGW 216 though SGW 214. The create session request message 222 can include information elements of ULI and MS Info change reporting support indication. An optional policy transaction can occur in 224. PGW 216 decides to track UE's 210 location in 226. In 226, the decision can be made by logic running on hardware or in a computer readable medium. The decision can also be based on policy information if the option policy transaction occurs in 224. A create session response message 228 is sent from P-GW 216 to MME 212 through SGW 214. The create session response message 228 can include an information element MS info change reporting action, which can be set to start. In 230, MME 212 detects a change in UE 210 location/information due to a handover in 232. MME 212 sends a MS info change notification request message 234 to P-GW 216 through SGW 214. The MS info change notification request message 234 can include an international mobile subscriber identity (IMSI), a radio access technology (RAT) type, and a ULI. An optional policy transaction 236 can occur to update PCRF 218, in some embodiments. P-GW 216 sends a MS info change notification response message 238 to MME 212 through SGW 214. The MS info change notification response message 238 can include an IMSI and cause.

Figure 3:
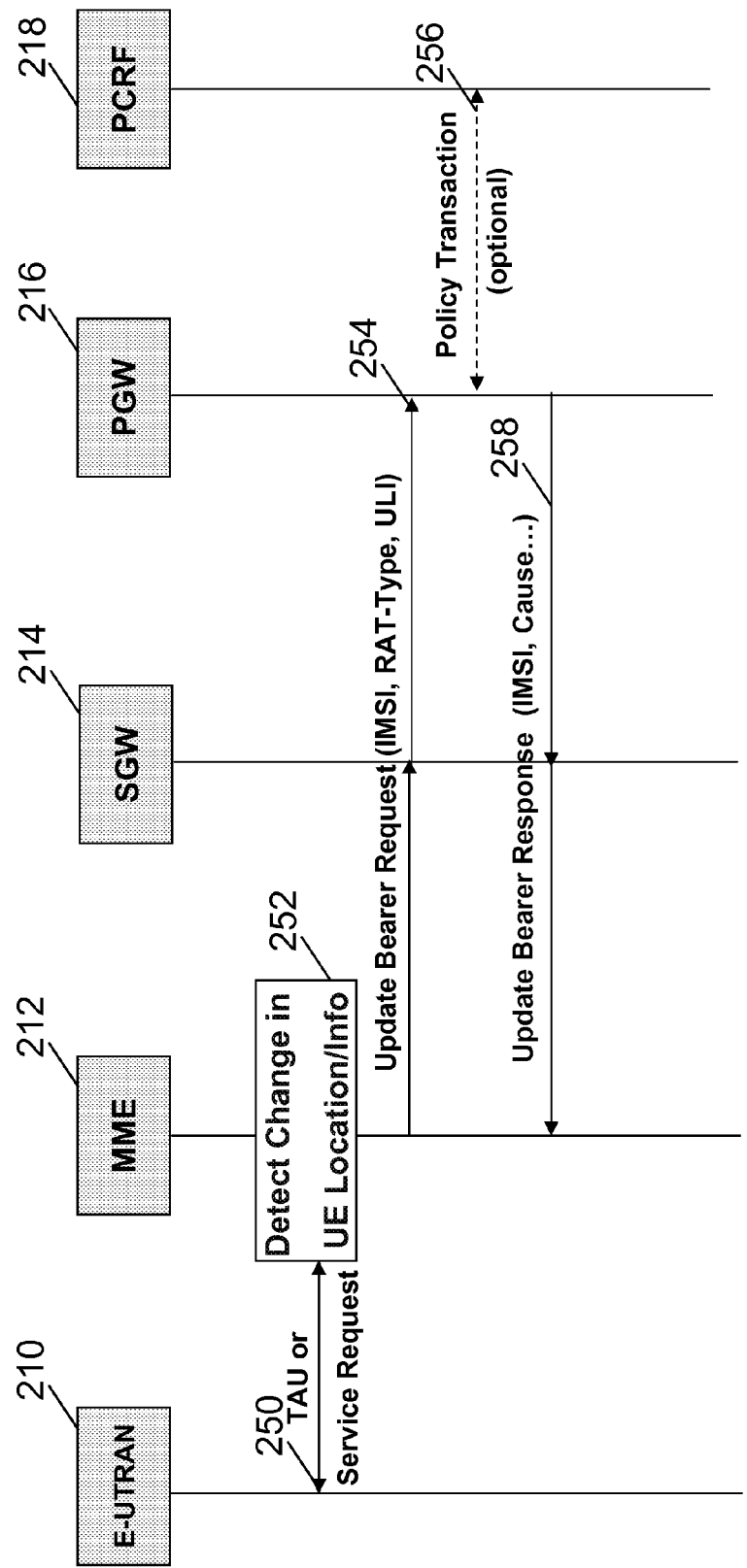
FIG. 3 illustrates a call flow diagram for service request in location reporting in accordance with certain embodiments.

FIG. 3 illustrates a call flow diagram for a service request in location reporting in accordance with certain embodiments. FIG. 3 includes an E-UTRAN 210, a MME 212, a SGW 214, a P-GW 216, and a PCRF 218. In 250, a tracking area update (TAU) or service request is exchanged between E-UTRAN 210 and MME 212. At 252, MME 212 detects a change in the UE location/information and initiates an update or service request. An update bearer request message 254 is sent from MME 212 to P-GW 216 through SGW 214 to update information or request a service or change in service. Update bearer request message 254 includes information elements such as an IMSI, a RAT-type, and a ULI. The P-GW 216 can use these information elements to update the network as to the change or request. An optional 256 policy transaction can occur with PCRF 218 as part of the update or request. The P-GW 216 can acknowledge the update or request by sending an update bearer response message 258 to MME 212 through SGW 214. The update bearer response message 258 can include an IMSI or other identification information and a reason for the response message. In the case of a service request, the response message can indicate whether or how the service request is to be fulfilled.

Figure 4:
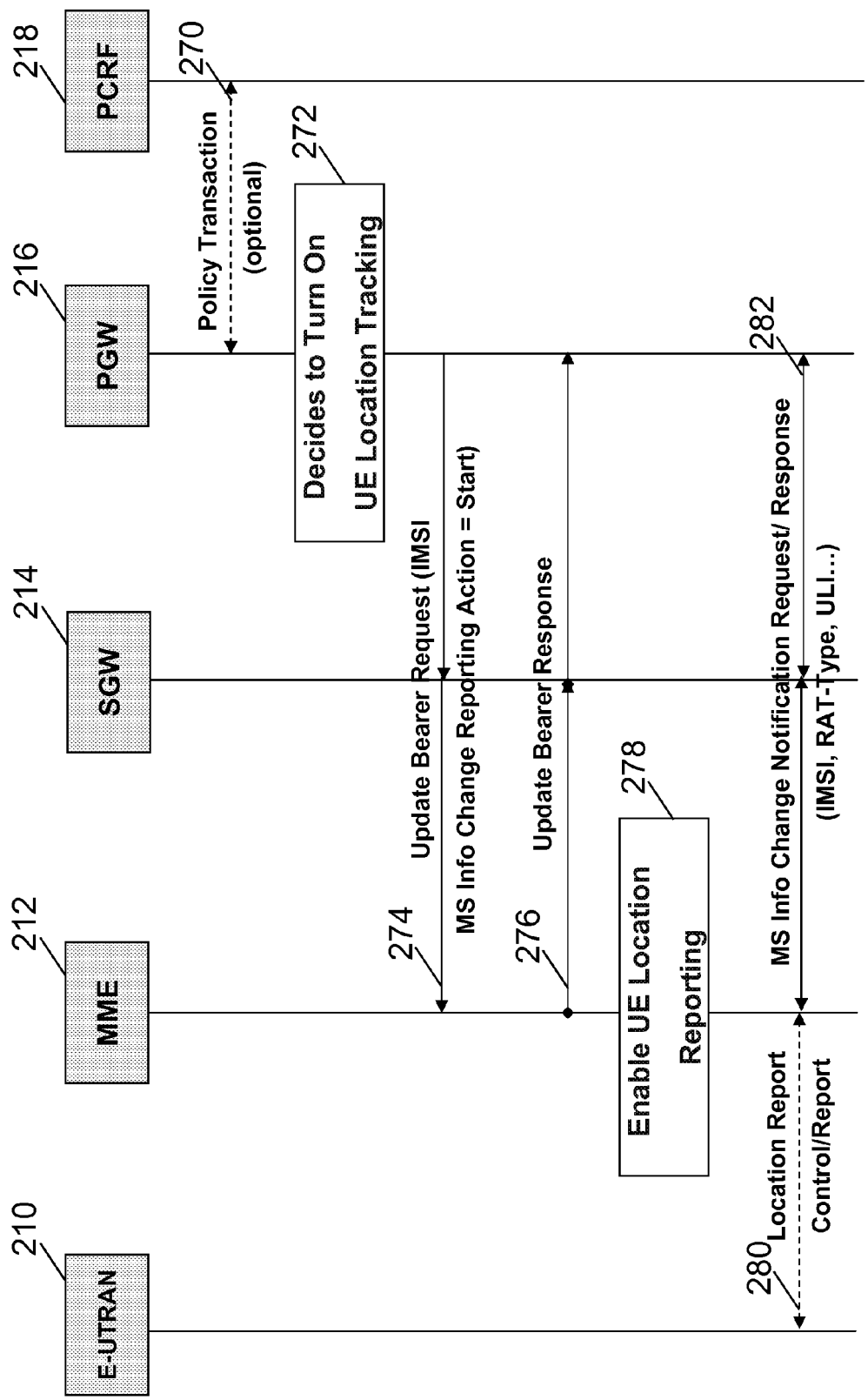
FIG. 4 illustrates a call flow diagram for mid-session activation of location reporting in accordance with certain embodiments.

FIG. 4 illustrates a call flow diagram for mid-session activation of location reporting in accordance with certain embodiments. FIG. 4 includes an E-UTRAN 210, a MME 212, a SGW 214, a P-GW 216, and a PCRF 218. An optional policy transaction 270 can occur between PCRF 218 and P-GW 216 to activate location reporting mid session. P-GW 216 in 272 initiates location tracking for a particular UE. The determination to initiate can be made by a logic running on a computer readable medium or hardware, or be the result of a policy decision. P-GW 216 sends an update bearer request message 274 to MME 212 through SGW 214. The update bearer request message 274 includes IMSI or comparable identification information and a MS info change reporting action indicating location reporting should begin. In 276, MME 212 sends an update bearer response 276 to P-GW 216 through SGW 214 to acknowledge initiation of location reporting. MME 212, in 278, enables UE location reporting and sends messaging to initiate reporting with the UE and other network devices. In a messaging exchange 280, MME 212 initiates messaging with E-UTRAN 210 to retrieve a location report and send location reporting information to the UE. MME 212 exchanges a MS info change notification request and a MS info change notification response in 282 through SGW 214 to P-GW 216. The MS info change notification request message can include an IMSI or similar identification information, a RAT type, and an ULI. The MS info change notification response message can include can include identification information and a cause for the change.

Figure 5:
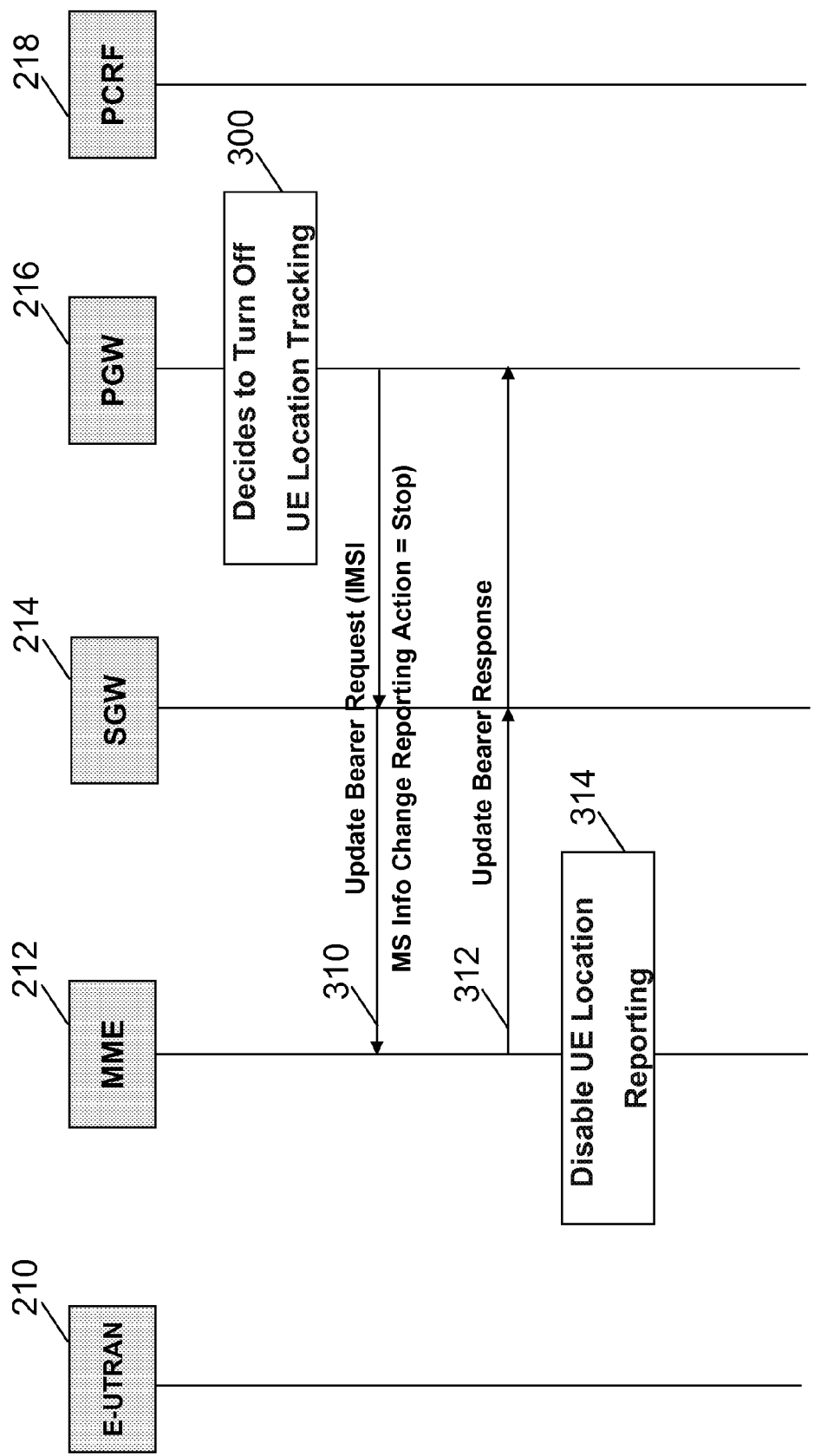
FIG. 5 illustrates a call flow diagram for mid-session deactivation of location reporting in accordance with certain embodiments.

FIG. 5 illustrates a call flow diagram for mid-session deactivation of location reporting in accordance with certain embodiments. FIG. 5 includes an E-UTRAN 210, a MME 212, a SGW 214, a P-GW 216, and a PCRF 218. P-GW 216, in 300, determines to disable location tracking for a particular UE. The determination can be made by a logic running on a computer readable medium or hardware, or be the result of a policy decision. P-GW 216 sends an update bearer request message 310 to MME 212 through SGW 214. The update bearer request message 310 includes IMSI or comparable identification information and a MS info change reporting action indicating location reporting should stop. MME 212 sends an update bearer response 312 to P-GW 216 through SGW 214 to acknowledge the deactivation of location reporting. In 314, MME 212 disables UE location reporting, and MME 212 may notify the UE by messaging the E-UTRAN 210 in some embodiments.

Figure 6:
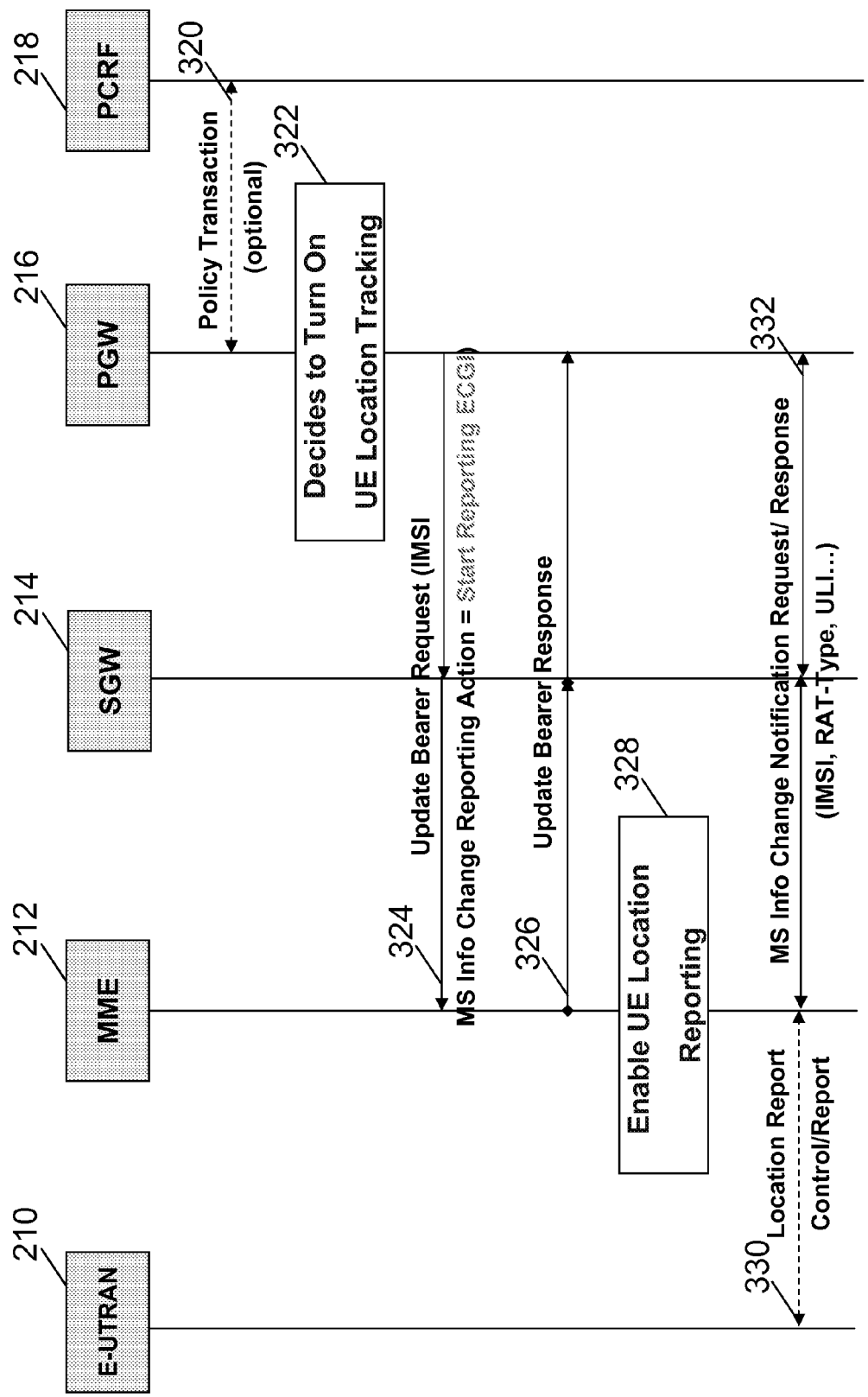
FIGS. 6 and 7 illustrate a call flow diagrams for a change in action mid-session of location reporting in accordance with certain embodiments.

FIG. 6 illustrates a call flow diagram for mid-session change in activation of location reporting in accordance with certain embodiments. FIG. 6 includes an E-UTRAN 210, a MME 212, a SGW 214, a P-GW 216, and a PCRF 218. An optional policy transaction 320 can occur between PCRF 218 and P-GW 216 to initiate a change in action mid session. P-GW 216 in 322 determines to initiate a location tracking change in action for a particular UE. The determination can be made by a logic running on a computer readable medium or hardware, or be the result of a policy decision. P-GW 216 sends an update bearer request message 324 to MME 212 through SGW 214. The update bearer request message 324 includes IMSI or comparable identification information and a MS info change reporting action indicating reporting of enhanced cell global identity (ECGI) should begin. MME 212 sends an update bearer response 326 to P-GW 216 through SGW 214 to acknowledge initiation of ECGI reporting. MME 212, in 328, enables UE location reporting and sends messaging to initiate reporting with the UE and other network devices. In a messaging exchange 330, MME 212 initiates messaging with E-UTRAN 210 to retrieve a location report and send location reporting information to the UE. MME 212 exchanges a MS info change notification request and a MS info change notification response in 332 through SGW 214 to P-GW 216. The MS info change notification request message can include an IMSI or similar identification information, a RAT type, and an ULI. The MS info change notification response message can include can include identification information and a cause for the change.

Figure 7:
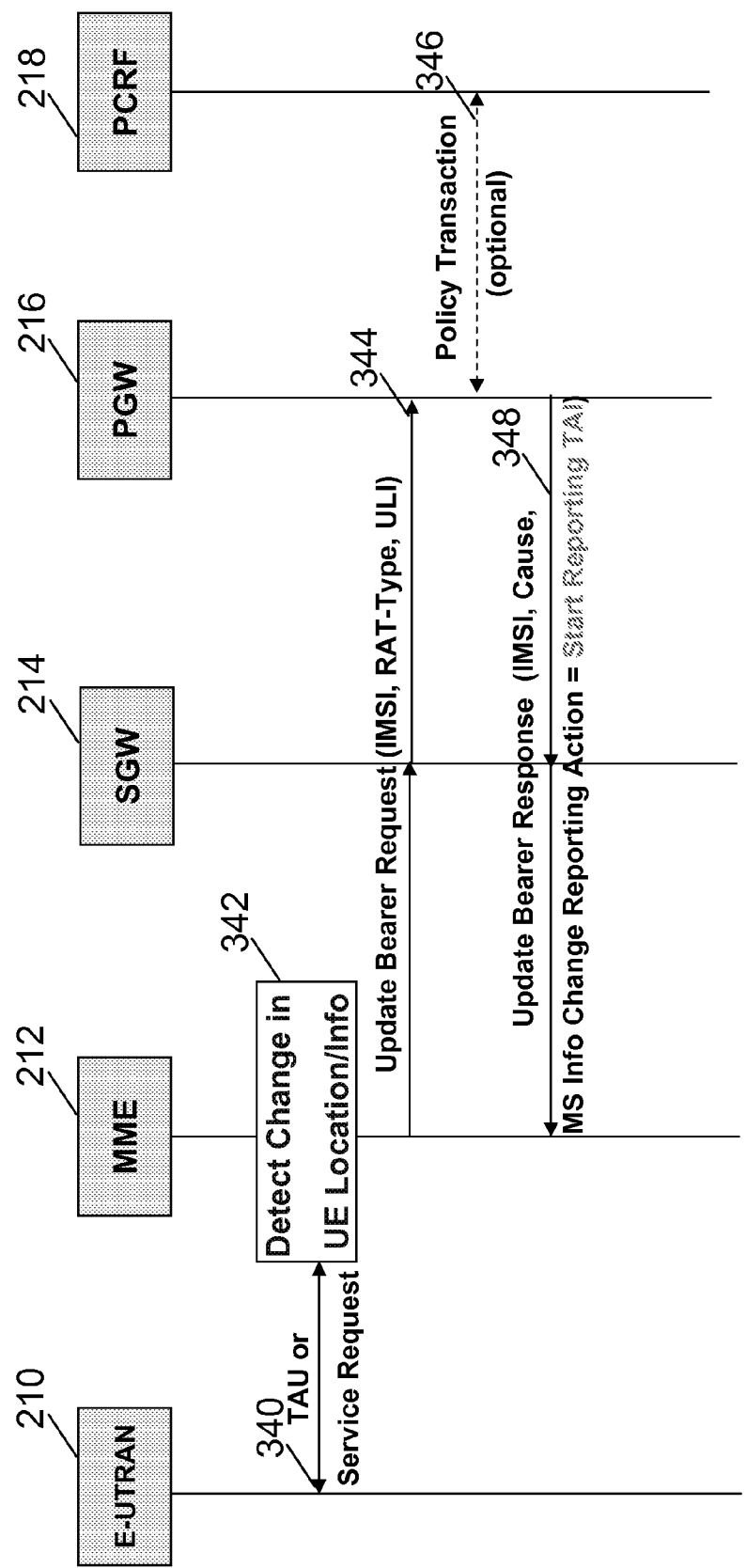

FIG. 7 illustrates a call flow diagram for a service request in location reporting in accordance with certain embodiments. FIG. 7 includes an E-UTRAN 210, a MME 212, a SGW 214, a P-GW 216, and a PCRF 218. In 340, a tracking area update (TAU) or service request is exchanged between E-UTRAN 210 and MME 212. At 342, MME 212 detects a change in action mid-session and initiates an update or service request. An update bearer request message 344 is sent from MME 212 to P-GW 216 through SGW 214 to update information or request a service or change in service. Update bearer request message 344 includes information elements such as an IMSI, a RAT-type, and a ULI. The P-GW 216 can use these information elements to update the network as to the change or request. An optional 346 policy transaction can occur with PCRF 218 as part of the update or request. The P-GW 216 can acknowledge the update or request by sending an update bearer response message 348 to MME 212 through SGW 214. The update bearer response message 348 can include an IMSI or other identification information and a MS info change reporting action that indicates reporting of tracking area identity (TAI) is starting.

In providing location reporting, in some embodiments, a new user location info (ULI) information element is placed in messages originated by the MME towards the SGW and P-GW. The ULI can include multiple fields or pieces of information. The ULI can include fields such as location type (with values of, e.g.: ECGI, TAI), geographic location, location area code, cell identity, and tracking area code. The MME can include the ULI information element in messages if the UE is located in a RAT type of E-UTRAN. The MME includes the ECGI or TAI in the ULI information element in the geographic location field to indicate whether the UE is in a cell or a tracking area respectively. The ECGI and TAI can also indicate a specific geographic location to the network for charging and service provision, for example. In some instances, the fields of the ULI can be populated with information from the MS info change reporting action information sent from the P-GW. An information element that indicates to the P-GW that the MME supports UE location reporting is the MS info change reporting information element. The MS info change reporting information element can be placed in messages originated by the MME towards the SGW and P-GW. A MS info change reporting action information element can be used by the P-GW to indicate that UE location information notifications are to be sent to the P-GW. The MS info change reporting action information element can be used in messages originated by the P-GW towards the SGW and MME. The format of the MS info change reporting action information element can include a type field to identify the information element and an action field that can include values to indicate stop reporting, start reporting ECGI, start reporting TAI, and start reporting ECGI/TAI, in some embodiments. The MME, SGW, and P-GW can support the MS info change notification request message which is sent by the MME upon detecting a change in the UE's information, e.g., location and the MS info change notification response which the P-GW sends to acknowledge receipt of the MS info change notification request from the MME.

The gateway described above is implemented in a chassis in some embodiments. This chassis can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an inter-rogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 8:
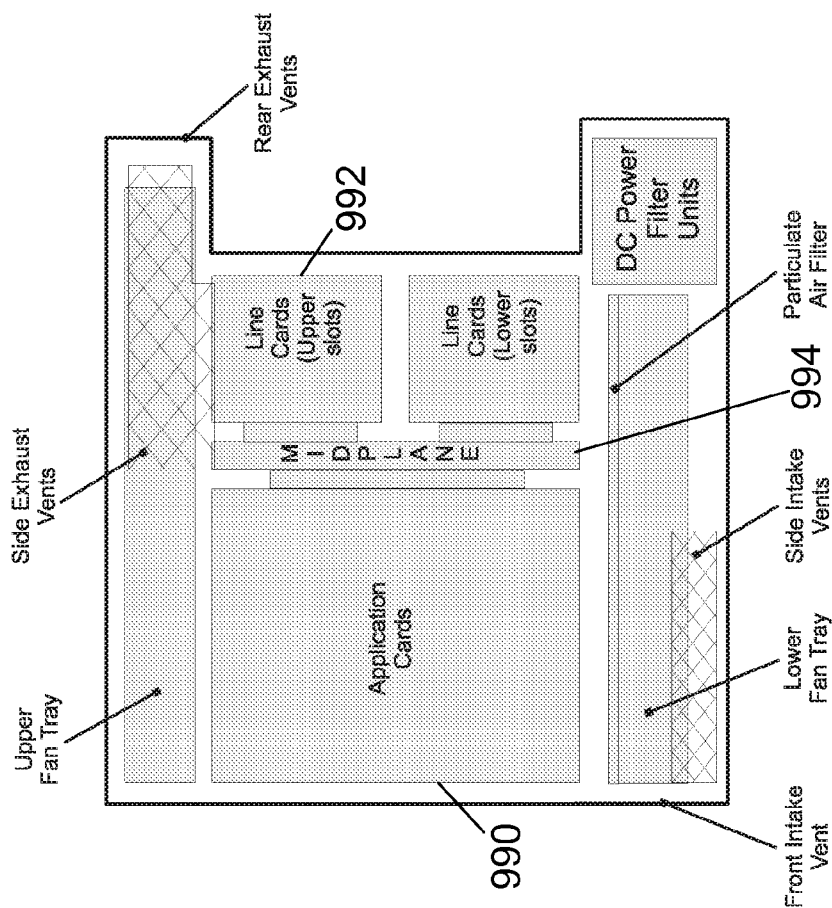
FIG. 8 illustrates a chassis in accordance with certain embodiments.

The features of a chassis that implements a gateway, in accordance with some embodiments, are further described below. FIG. 8 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides mutli-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A gateway in a communication network implementing a mobility management entity (MME) function comprising:
   an interface configured to communicate between the MME function on the gateway and a radio access network, the communications including attach messaging and bearer activation messaging, and receiving at least one of a user equipment (UE) handover messaging and a tracking area update messaging;
   a processor for enabling UE location reporting on the MME function and detecting a change in at least one of UE location and information received from the radio access network; and
   an interface configured to communicate between the MME function on the gateway and a serving gateway (SGW) including:
      sending a create session request including a user location information (ULI) information element that provides location information regarding a UE, and an information element that indicates location reporting is supported;
      receiving a response message including an indication to start tracking the UE's location;
      sending a message to update a change in UE location or information, wherein the message includes an identifier for the UE, a radio access technology type identifier and the ULI.

2. The gateway of claim 1, wherein the MME function is configured to provide enhanced cell global identity (ECGI) and tracking area identity (TAI).

3. The gateway of claim 2, wherein an information element in an S11 interface message from the SGW includes a value to indicate a start of reporting of at least one of ECGI and TAI.

4. A method of reporting location of user equipment in a communication network at a mobility management entity (MME), the method comprising:
   sending a create session request message from the MME to a serving gateway (SGW) including a user location information (ULI) information element that provides location information regarding a UE, and an information element that indicates location reporting is supported;
   receiving a response message at the MME from the SGW including an indication to start tracking the UE's location;
   in response to an indication to start tracking the UE's location, enabling UE location reporting on the MME;
   detecting a change in at least one of the UE's location and the UE's information at the MME;
   in response to detecting the change, sending a message to the SGW to update at least one of the UE's location and the UE's information.

5. The method of claim 4, further comprising tracking enhanced cell global identity (ECGI) and tracking area identity (TAI) at the MME.

6. The method of claim 5, wherein an information element in an S11 interface message received from the SGW includes a value to indicate start reporting at least one of ECGI and TAI.

7. A gateway implementing a mobility management entity (MME) function configured to communicate with at least one radio access network and at least one serving gateway (SGW)

to provide location reporting regarding at least one user equipment, the gateway including:

a network interface and a processor configured to perform the location reporting including detecting a change in UE location information received from the radio access network and creating a location reporting session by sending a create session request message to a SGW, the create session request message including a user location information (ULI) information element that provides location information regarding a UE and information elements that indicate location reporting is supported and receiving a response message from the SGW, the response message indicating when location reporting can begin, wherein update message messages are sent to the SGW to update changes in UE location or information as these changes are detected by the MME.

8. The gateway of claim 7, wherein the MME function is configured to provide enhanced cell global identity (ECGI) and tracking area identity (TAI).

9. The gateway of claim 8, wherein an information element in an S11 interface message from the SGW includes a value to indicate a start of a reporting of at least one of ECGI and TAI.

10. The method of claim 4, further comprising sending a message to the MME to deactivate the location reporting session.

11. The method of claim 4, further comprising performing handshaking between the MME and the SGW to create a location tracking session.

12. The method of claim 4, further comprising initiating tracking based on a policy transaction with a policy and charging rules function (PCRF).

13. The gateway of claim 1, the interface configured to communicate between the MME function and the SGW further including sending a message to the MME to deactivate the location reporting session.

14. The gateway of claim 1, the interface configured to communicate between the MME function and the SGW further including performing handshaking between the MME and the SGW to create a location tracking session.

15. The gateway of claim 1, further comprising initiating tracking based on a policy transaction with a PCRF.

16. A mobile device in a communication network comprising:

a processor for detecting a change in at least one of location and tracking area information received from a radio access network; and an interface configured to communicate with an MME function on a gateway via the radio access network for location tracking, the communications including:

attach messaging and bearer activation messaging;

mobile device handover messaging;

receiving a location reporting session activation message from the MME, signifying that location information for the mobile device will be tracked by the MME and sent to a gateway for each change in mobile device location;

sending an update message to update a change in mobile device location or information; and receiving a location reporting session deactivation message from the MME, signifying that location information for the mobile device will no longer be tracked.

17. The mobile device of claim 16, wherein the update message includes one or more of an identifier for the mobile device, a radio access technology type identifier and a user location information (ULI) information element.

18. The mobile device of claim 17, the identifier further comprising an international mobile subscriber identity (IMSI) used by the MME for location tracking.

19. The mobile device of claim 17, the ULI information element further comprising information relating to at least one of location type, geographic location, location area code, cell identity, and tracking area code.

20. The mobile device of claim 16, wherein receiving a location reporting session deactivation message from the MME is received via an evolved universal mobile telecommunications system (UMTS) radio access network (E-UTRAN).

* * * * *